Jan. 1, 1957
D. J. MILLER
2,776,106
VALVE
Filed Sept. 14, 1953
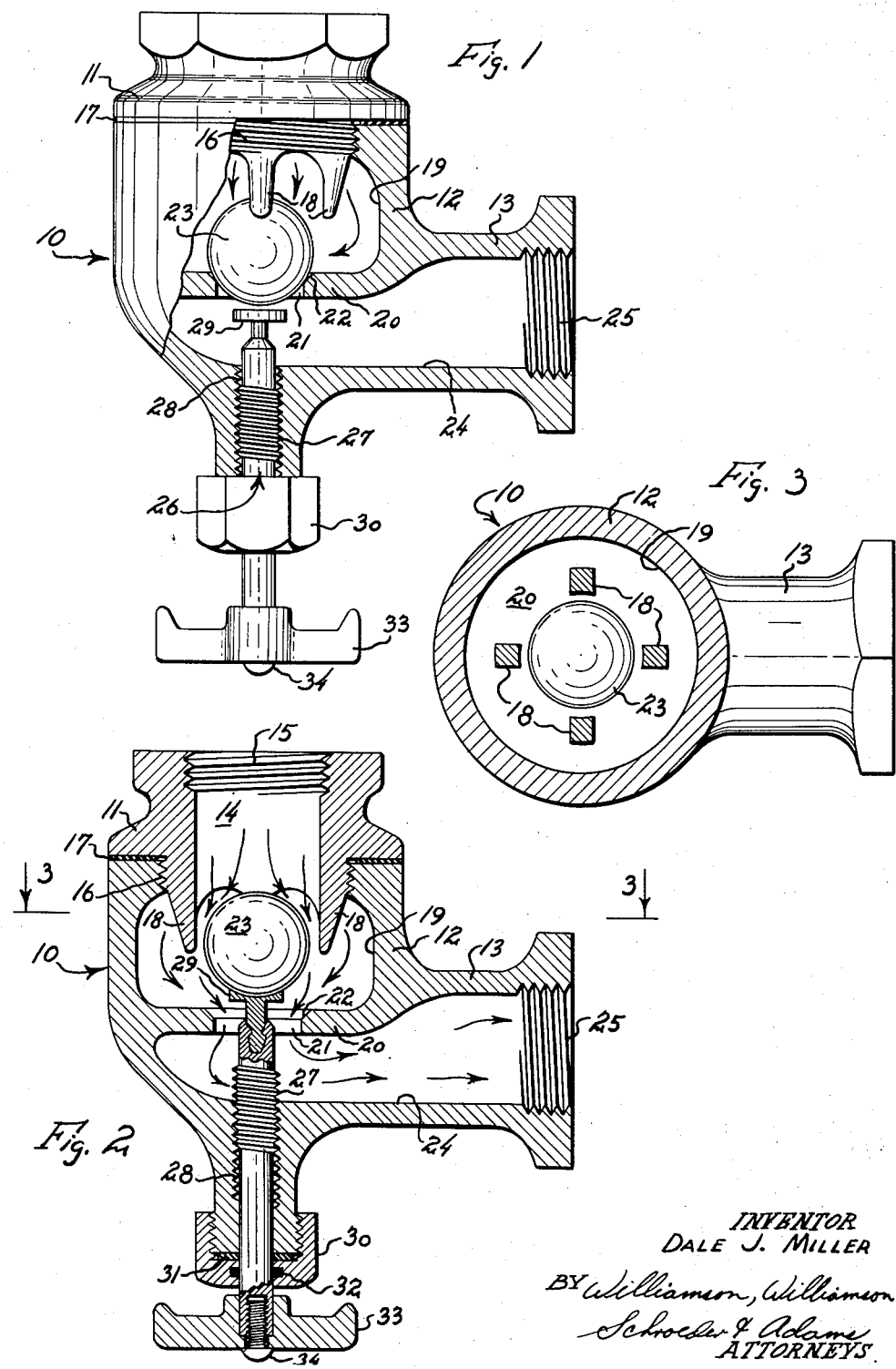
INVENTOR
DALE J. MILLER
BY Williamson, Williamson,
Schroeder & Adams
ATTORNEYS.

United States Patent Office 2,776,106
Patented Jan. 1, 1957

2,776,106

VALVE

Dale J. Miller, Austin, Minn.

Application September 14, 1953, Serial No. 379,938

3 Claims. (Cl. 251—275)

This invention relates to a fluid valve structure and more particularly to a ball type valve in which a freely floating resilient ball is adapted to be seated and unseated within the structure to restrict and permit fluid flow through the valve.

It is an important object of the invention to provide a simple and efficient ball valve which is fast and positive in action yet will give long and trouble free operation.

It is another object of the invention to provide a ball valve in which the ball member is closely confined in its travel yet permits free flowing of fluid therearound while unseated and further allows the ball to turn at random so that when subsequently seated, it will not become stressed and wear at any particular area on the spherical ball.

It is a further object of the invention to provide a valve having a free-floating ball which is maintained in axial alignment with the incoming flow of fluid during both its seated and unseated position, thus creating a minimum of lateral stress upon the valve structure during the operation thereof.

It is a still further object of the invention to provide for retraction means to operate the valve, the said means being maintained in axial alignment with the ball valve and inlet passageway and the outlet passageway being diverted laterally to provide for an outwardly extending handle portion of the retraction element.

These and other objects and advantages of my invention will more fully appear from the following description made in connection with the accompanying drawings wherein like reference characters refer to similar parts throughout the several views and in which:

Fig. 1 is a side view of my valve structure, a portion of the housing being cut away in vertical section to better show the internal parts;

Fig. 2 is a vertical section of the entire valve structure, the ball valve and portions of the retraction element being shown in full line; and Fig. 3 is a horizontal cross section of the valve structure taken on the line 3—3 of Fig. 2 and looking in the direction of the arrows. A spherical ball is in full line.

Referring now more particularly to the drawing, the valve structure comprises a housing 10 having an inlet 11, an enlarged valve chamber 12 and an outlet 13 as shown. The inlet 11 has an inlet passageway 14 which is adapted to be threadedly secured at 15 to an inlet pipe (not shown). The inlet passageway 14 is preferably cylindrical and straight, the longitudinal axis thereof being in a straight line extending vertically as shown in Figs. 1 and 2. The inlet 11 may be separately formed as an upper portion of housing 10 and threadedly attached thereto at 16. Conventional gasket means 17 may be interposed between the lower portion of the housing and the inlet 11 to prevent leakage of fluid therethrough. The lower portion of inlet 11 may be provided with retaining means such as fingers 18 which extend downwardly into the enlarged valve chamber 12 but which have ample space in between to allow passage of fluid therethrough. The purpose of the fingers will be set forth more fully hereinafter. The internal chamber within the enlarged valve chamber 12 of housing 11 is defined by an inner wall 19, the outer periphery of which extends outwardly from fingers 18 to allow fluid to pass between the fingers and into the enlarged chamber.

Transversely of the enlarged valve chamber 12 is a fluid barrier 20 which may be formed integrally with the housing 10 as shown. The fluid barrier has an opening 21 which is preferably circular in shape and is provided with an annular seat 22 at the side of the barrier defining a wall portion of the internal chamber 19 as shown in Figs. 1 and 2. The annular seat 22 is adapted to cooperate in sealing engagement with a ball valve such as the spherical valve member 23, the ball valve preferably being constructed of resilient and tough material such as hard rubber or plastic material.

Beyond the opening 21 is an outlet passageway through outlet 13, the outlet passageway being defined by inner walls 24 and the passageway having a longitudinal axis which is laterally disposed with respect to the longitudinal axis of the inlet passageway 14. The inlet passageway 14, the enlarged valve chamber 19 and the outlet passageway 24 define an interconnecting conduit through which fluid may pass from a pipe connection at the inlet to another pipe connection threadedly secured at 25 to the outlet 13.

Mounted in axial alignment with the inlet passageway 14 is a retraction element such as the valve stem member 26 shown in Figs. 1 and 2. The retraction element may be threadedly mounted at 27 through an opening 28 formed in housing 10 as shown. The inner end of the retraction element has associated therewith an abutment 29 which is adapted to engage the underside of spherical ball 23 and to unseat it from the annular seat 22. The abutment 29 preferably constitutes a cup-shaped member which can turn freely with respect to the retraction element 26 and may even have a slight amount of play to assist in the free seating of spherical ball member 23 when the retraction element is retracted. A packing nut 30 and gasket members 31 and 32 may be provided to afford a liquid-tight seal between the internal interconnecting conduit and the outer atmosphere at the union with the retraction element. A manual member such as handle 33 may be attached by screw member 34 to provide means to turn the retraction element for advancing and retracting in axial and longitudinal alignment with the inlet passageway and the annular opening 21.

In the operation of my fluid valve structure, the valve is preferably mounted as shown with the spherical ball 23 seated above the annular seat 22. It is understood, however, that the valve may be placed in any other position where the fluid pressure in the inlet 11 is sufficient to bring spherical ball 23 up to the opening 21 in seated relation with the annular seat 22. Normal city water pressures are more than adequate to accomplish the foregoing with the valve in any position. When the retraction element 26 is in the retracted position shown in Fig. 1, the ball 23 will be permitted to seal off entirely the flow of fluid from the inlet 11. It will be noted that the retraction element is aligned longitudinally with the axis of inlet passageway 14, with the spherical ball 23, and with respect to the annular seat 22. The outlet 13 has its longitudinal axis angulated with respect to that of the inlet so as to permit the retraction element to be aligned as above described.

As the retraction element is screwed inwardly (preferably by left hand threads 27—28) the abutment member 29 is caused to engage the spherical ball 23. Further advancement will unseat the ball pushing it to the position shown in Fig. 2. Fluid will then freely flow into the enlarged chamber 19 and between the fingers 18, then through the opening 21 and through the outlet 13. The flow of fluid about the ball valve 23 may cause it to oscillate and to turn in random fashion. The fingers 18, however, will maintain the ball generally in aligned relation with the retraction element 26 at all times. Where the abutment member 29 is permitted to swivel, then the ball can rotate upon a longitudinal axis even though in pressing engagement with the abutment member. As the ball valve is allowed to become seated as the retraction element is withdrawn, the ball will fall in random and will not tend to wear in any one area. Such arrangement, of course, creates a trouble free condition which will last for a considerably greater length of time than where the valve member is seated in exactly the same relative position each time with respect to its seat.

Because the spherical ball is seated and unseated in an aligned direction, fluid will flow uniformly about the ball and will not tend to cause lateral pressure or stress thereon at any time. As a result, the ball is quickly and positively seated and unseated without lateral stresses or rubbing action which may tend to increase the rate of wear upon the valve.

It may thus be seen that I have devised an extremely simple valve structure which does not require springs and which is so arranged that the wear thereon is distributed and minimized, the valve further supplying a smooth and unrestricted flow of fluid therethrough when in open position.

It will, of course, be understood that various changes may be made in the form, details, arrangement and proportions of the parts without departing from the scope of my invention.

What I claim is:

1. A fluid valve structure comprising a housing having an inlet passageway, an intermediate enlarged valve chamber and an outlet passageway, said passageways and valve chamber defining an interconnecting conduit through the valve structure, said inlet passageway and said intermediate enlarged valve chamber having a common vertical axis and said outlet passageway having its longitudinal axis disposed laterally with respect to said vertical axis, a liquid-tight barrier having an opening with an annular seat thereabout disposed transversely of said enlarged valve chamber, a unitary spherical valve member encased in said enlarged chamber with substantial clearance peripherally of the spherical valve member and the chamber sides and seatable in fluid-sealing relation on said annular seat, depending fingers annularly mounted within said housing and in free and open relation with respect to one another and the chamber sides, said depending fingers terminating at a position well away from the barrier but lying in close clearance with said spherical valve member for maintaining the latter in substantial alignment with said inlet passageway and said annular seat, and a retraction element mounted in said housing and having a cup-shaped terminus lying along said vertical axis beneath said opening and annular seat for longitudinal movement along said axis to engage the spherical valve member in cupped relation and for maintaining the valve member in axial alignment along said vertical axis while permitting free turning thereof and balanced flow of fluid through said chamber while said spherical valve member is in unseated position.

2. The subject matter of claim 1 and an annular inlet member threadably secured outwardly of the enlarged valve chamber and integrally formed with said depending fingers, said annular inlet member having said inlet passageway formed therethrough.

3. A fluid valve structure comprising a housing having an inlet passageway, an intermediate enlarged valve chamber and an outlet passageway, said passageways and valve chamber defining an interconnecting conduit through the valve structure, a liquid-tight barrier disposed transversely of said enlarged valve chamber and having an opening with a circular valve seat formed medially therethrough, a ball valve member encased in said enlarged chamber with substantial clearance between the surface thereof and the chamber sides and adapted to seat in fluid-sealing relation on said circular valve seat, depending fingers annularly mounted within said housing in free and open relation with respect to one another and the chamber sides, said depending fingers being directed toward and terminating well away from the barrier but lying in close clearance with said ball valve member for maintaining the latter substantially aligned with said circular valve seat, and an extendible and retractable valve stem, said valve stem having an abutment member at its innermost terminus engageable with said ball valve member for unseating and seating with respect to said circular valve seat while maintaining the ball valve confined within the annularly arranged fingers and permitting free turning thereof and balanced flow of fluid through the chamber while said ball valve member is in unseated position.

References Cited in the file of this patent

UNITED STATES PATENTS

| Number | Name | Date |
|---|---|---|
| 98,153 | Deck | Dec. 21, 1869 |
| 675,665 | McCanna | June 4, 1901 |
| 799,202 | Swinny | Sept. 12, 1905 |
| 950,026 | Peterson | Feb. 22, 1910 |
| 999,608 | Stucky | Aug. 1, 1911 |
| 1,061,768 | McQuat | May 13, 1913 |
| 1,200,268 | Taggart | Oct. 3, 1916 |
| 1,206,216 | Gray | Nov. 28, 1916 |
| 1,378,030 | Hay | May 17, 1921 |
| 1,564,280 | Schmidt | Dec. 8, 1925 |
| 1,989,199 | Hummert | Jan. 29, 1935 |
| 2,278,715 | Stoyke | Apr. 7, 1942 |

FOREIGN PATENTS

| Number | Country | Year |
|---|---|---|
| 1,028 | Australia | 1931 |
| 8,246 | Great Britain | 1889 |